(12) United States Patent
Carroll (10) Patent No.: US 8,178,994 B2
(45) Date of Patent: May 15, 2012

(54) SELECTIVE PHASE COUPLER

(76) Inventor: Sean Carroll, Kelowna (CA)

( * ) Notice: Subject to any disclaimer, the term of this patent is extended or adjusted under 35 U.S.C. 154(b) by 999 days.

(21) Appl. No.: 12/068,190

(22) Filed: Feb. 4, 2008

(65) Prior Publication Data

US 2008/0185917 A1 Aug. 7, 2008

Related U.S. Application Data

(60) Provisional application No. 60/899,039, filed on Feb. 2, 2007.

(51) Int. Cl.
*H02J 3/02* (2006.01)
*H02J 3/34* (2006.01)

(52) U.S. Cl. .......................................................... 307/3

(58) Field of Classification Search .................... 307/1, 3; 340/310.11, 310.13
See application file for complete search history.

(56) References Cited

U.S. PATENT DOCUMENTS

| | | | |
|---|---|---|---|
| 4,382,248 A | 5/1983 | Pai | |
| 5,497,142 A | 3/1996 | Chaffanjon | |
| 6,317,031 B1 | 11/2001 | Rickard | |
| 6,407,987 B1 * | 6/2002 | Abraham | 370/295 |
| 7,102,478 B2 | 9/2006 | Pridmore, Jr. et al. | |

OTHER PUBLICATIONS

U.S. Appl. No. 09/746,330, filed Jun. 10, 2004, Hauck et al.
U.S. Appl. No. 10/061,798, filed Jun. 13, 2002, Abraham.

* cited by examiner

*Primary Examiner* — Jared Fureman
*Assistant Examiner* — Carlos Amaya
(74) *Attorney, Agent, or Firm* — Antony C. Edwards (57) ABSTRACT

Disclosed is an apparatus and method for communicating over an electrically conductive line having a plurality of power line phases between a first device having a single receiver and plurality of distal devices. The power line phases are adapted to deliver an alternating electrical current. Each of the distal devices are adapted to communicate with the first device over a single phase through a modulated carrier signal at a communication frequency. The apparatus comprises a plurality of unique coupling phases for coupling to a corresponding power line phase adapted to receive a frequency band having the modulated carrier signal from each of the plurality of power line phases and a selective coupling circuit between each of the plurality of coupling phases. The method comprises receiving the modulated carrier signal from each of the plurality of power line phases, attenuating the frequency band from being received by another of said unique coupling phases.

31 Claims, 6 Drawing Sheets

PRIOR ART

SELECTIVE PHASE COUPLER

CROSS REFERENCE TO RELATED APPLICATION

This application claims priority from U.S. Provisional Patent Application No. 60/899,039 filed Feb. 2, 2007 entitled Selective Phase Coupler.

FIELD OF THE INVENTION

This invention relates to communications between a central controller and a number of slave units in the presence of noise and attenuation and in particular the case where the communications channel is the power line and where narrow band signaling is used.

BACKGROUND OF THE INVENTION

Power distribution lines are well known as are dedicated communication lines. In recent years, efforts have been made to combine power and communication lines so as to permit data signals over power distribution lines. Methods of attempting this are well known and typically operate by impressing a high frequency modulated carrier signal onto the alternating current waveform of the power distribution wiring system. The resulting reduction in infrastructure both reduces the cost and effort to provide data services to various locations, but also provides greater modularity to moving or relocating points of need for data transmission as any existing power distribution line may be utilized to provide both of these services simultaneously.

There are however, a number of difficulties to transmitting data over power distribution lines. Most significantly, electrical noise may serve to obscure the data signal transmitted and received from one device to another. Sources of noise may disadvantageously correspond to the data transmission frequency which will therefore obscure or otherwise interfere with the transmission and reception of the desired data signal.

In particular, difficulties have arisen when a plurality of devices are located on a plurality of phases that are required to talk to a central controller. It will be seen that where a plurality of phases are used, the addition of noise from all the phases will prevent devices on the different phases from communicating with a central controller due to unattenuated noise on one phase interfering with an attenuated signal on another phase, herein intended to include where in two phases there is equal attenuation in the two phases with one phase noisier than the other so as to interfere with the less noisy phase, or to the absence of a quiet period during the signal at the zero crossing of the alternating current waveform.

Figure 1:
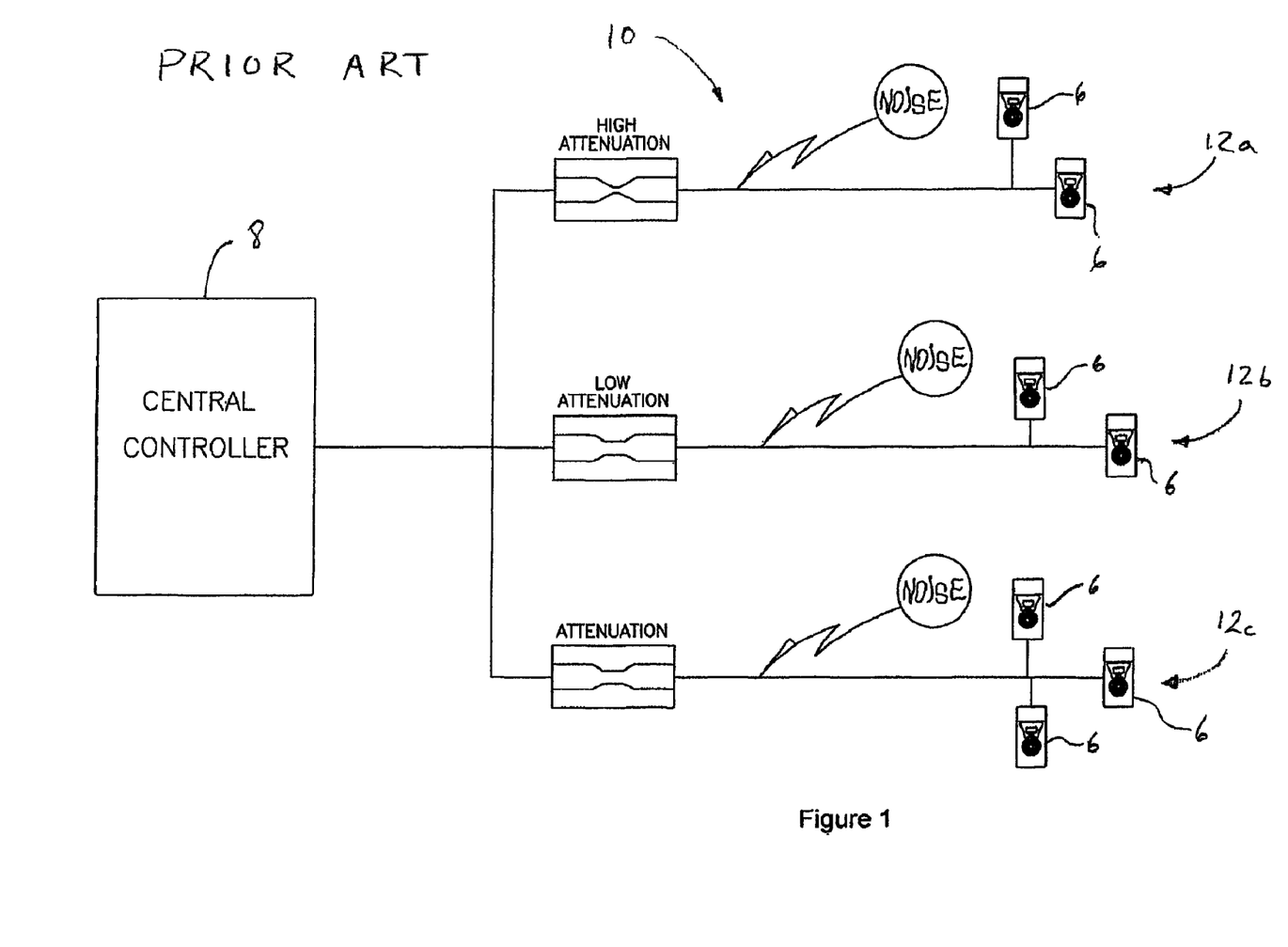
FIG. 1 is a block diagram of a prior art system having a central controller and a plurality of distant slaves for communicating across three phases of a power line distribution system.

FIG. 1 helps demonstrate the problem that exists. In this figure there are a number of slave units 6 located on first second and third phases 12a, 12b and 12c, respectively of the power line system 10 at a distance from a central controller 8. As well as the slaves 6 there are noise sources. In the system illustrated in FIG. 1, the Central Controller 8 will have difficulty hearing slave units 6 whose signal is obscured by noise.

The first phase 12a of FIG. 1 shows that there is high attenuation on this phase between the slaves 6 and the central controller 8 and between the noise sources on this phase and the central controller 8. The second phase 12b, shows that there is a small amount of attenuation between the slaves 6 and the central controller 8 and between the noise sources and the central controller 8. Because the signals from the slaves 6 and the noise are summed at the central controller 8 the signals from those slaves 8 associated with the first phase 12a, can easily be obscured by the un-attenuated noise from the second phase 12b.

Figure 2A:
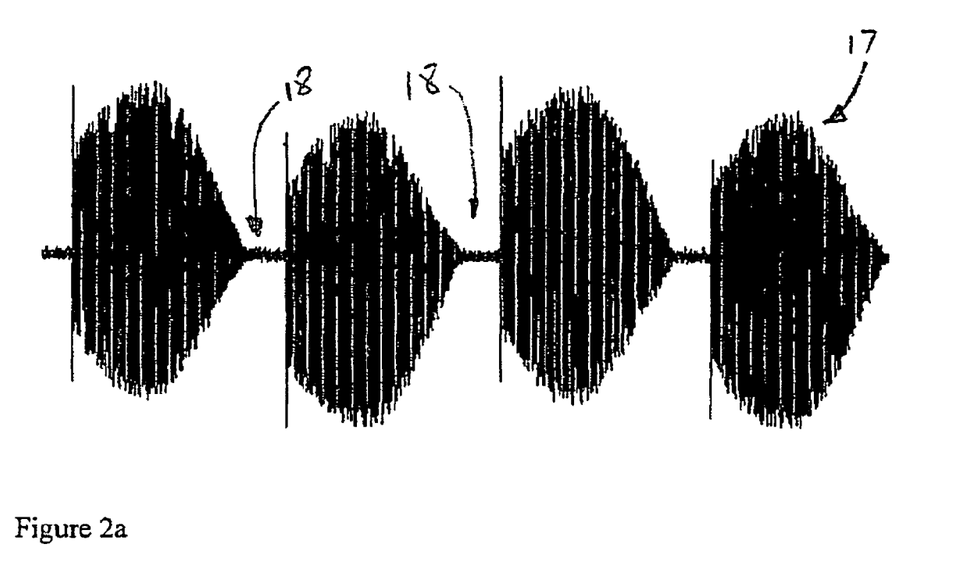
FIG. 2a is a graph of voltage over time of a single phase power signal for a halogen lamp showing the noise generated by the halogen lamp.
Figure 2B:
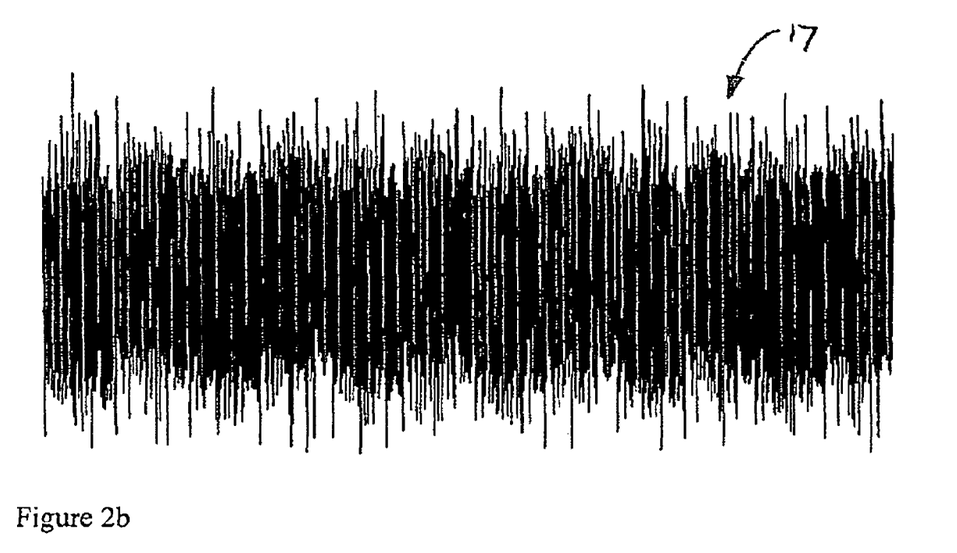
FIG. 2b is a graph of voltage over time of three phases power signal each having a halogen lamp showing the summed noise generated by the halogen lamps.

Illustrated in FIGS. 2a and 2b, are voltage measurements 17 of the signal on a single and three phase system including a noise source as measured by an oscilloscope with the power line AC waveform removed. FIG. 2a show the noise from a halogen lamp power supply over two cycles of a single phase of the power line. As can be seen there is a quiet period 18 when the noise is at a minimum. This period is associated with the zero crossing of the power line when the power supply effectively turns off. Even if the bulk of the noise is at the frequency of communications, signals can be easily received during the quiet period.

FIG. 2b shows the same noise as FIG. 2a but now coming from three halogen power supplies on three different phases and summed. As can be seen the quiet period is no longer present.

Various methods have been attempted to attenuate the noise sources from a data signal. Many of these have required that the attenuating device be inserted into the power distribution line itself or around the line as an RF Choke. Such devices are not desirable due to the fact that devices inserted into the power line need to be sized large enough to handle the power capacity of the power line. RF chokes are also known to be of limited usefulness for high power applications as well as for preventing cross-phase noise. Examples of such systems include U.S. Pat. No. 5,497,142 to Chaffanjon and U.S. Pat. No. 7,102,478 to Pridmore, Jr. et al.

Other attempts to solve this problem have not provided for a method of isolating the separate phases from each other so as to prevent noise from one phase obscuring the signal in another phase. An example of such attempts is illustrated in U.S. Patent Application No. US2004/0108941 to Hauck et al. which utilizes a repeater coupler between phases. Similarly, U.S. Pat. No. 6,317,031 to Rickard relies on coupling between proximate different phases in a common distribution cable such that leakage between the phases permits a data signal on one phase to be induced on proximate phases.

These solutions have not been useful for the present application. As mentioned above, these previous attempts to solve this problem have not provided a method for attenuating the noise between phases. Rather the solutions of Hauck et al. and Rickard will transmit or amplify the data signal and the noise signal of one phase to another. For this reason, both of these devices will not increase the ability of a single device to bear or transmit data to a device on a separate phase as the noise of both phases will add together to eliminate quite periods at the zero crossing of a single phase.

Other solutions have relied upon complex devices or devices in which separate amplifiers or receivers are provided for each phase. Examples of such devices are provided in U.S. Pat. No. 4,382,248 to Pai and U.S. Patent Application Publication No. US2002/0071452 to Abraham. These devices would not be suitable for most applications due to the costs and spatial requirements of such devices.

For the above reasons it is desirable to have a way of separating the various phases. However, the central controller needs to communicate to all the slaves. Often it is the case that the central controller can communicate directly to many or most of the slaves on a given phase. So what is desired is a way of having direct communications between the different phases and the central controller as well as having a way to separate the different phases from each other.

SUMMARY OF THE INVENTION

In a system where a plurality of remote devices communicate with a central controller on a corresponding plurality of phases, and where the summing together of noise on said plurality of phases will prevent a corresponding number of said plurality of remote devices on the corresponding different phases from communicating with the central controller due to unattenuated noise on a first phase interfering with an attenuated signal on a second phase, the present invention may be characterized in one aspect as including
a method and apparatus for selective phase coupling between said first and second phases, the method comprising the steps of:
  a) allowing, and in the apparatus means for allowing, the central controller to communicate with the respective remote devices on said first and second phases,
  b) allowing, and in the apparatus means for allowing, the respective remote devices to communicate with the central controller on said first and second phases,
  c) selectively inhibiting, and in the apparatus means for selectively inhibiting, unattenuated in-band noise on said first phase from interfering with an attenuated signal on said second phase.

In particular, the present invention may be characterized as a method of and apparatus for selectively phase coupled power line communication over an electrically conductive line having a plurality of phases between a first communication device and a plurality of other devices communicating at a communication frequency. For each phase of the plurality of phases a device of the plurality of other devices communicates at the communication frequency with the first communication device substantially over a single phase. The method comprises, that is includes, the steps of receiving communications in the first communication device from the plurality of other devices; minimizing coupling between at least two of the plurality of phases so as to substantially maintain isolation between those phases or to substantially isolate at least one of the single phases at the communication frequency, and receiving communications in the first communication device at the communication frequency from the substantially isolated phases so as to minimize electrical noise received by the first communication device which if summed between the isolated phases would interfere with the communications.

The apparatus comprises means for minimizing coupling between the phases to be isolated so as to substantially maintain isolation of or isolate at least one of the single phases at the communication frequency, and means for receiving communications in the first communication device at the communication frequency from the isolated phases so as to minimize electrical noise received by the first communication device which if summed between the phases being isolated from one another would interfere with the communications.

The method may include attaching in electrical communication a unique coupling phase to each power line phase for receiving a frequency band having the modulated carrier signal and a noise portion from each of the plurality of power line phases. Each of the coupling phases are out of the path of flow of the power line phase. The coupling phases are coupled to each other by means for minimizing coupling such that the frequency band receivable at the first device while attenuating the frequency band from being received by another of the unique coupling phases. The method may further comprise attenuating the alternating electrical current from the plurality of coupling phases. The means for minimizing coupling may include a selectively attenuating circuit between each of the plurality of phases wherein the selectively attenuating circuit is adapted to substantially block the frequency band. The selectively attenuating circuit may be adapted to have a resonant frequency at the communication frequency.

The means for minimizing coupling may be a decoupler having at least one capacitor and at least one inductor in series parallel with each other between the single phases to be isolated from each other. The series parallel capacitors and inductors may be selected to be resonant at the communication frequency. Each of the plurality of phases may include an in-line capacitor connected to the receiver. Each of the plurality of phases may include an inductor between each of the plurality of phases and a common node. The power line phases are adapted to deliver an alternating electrical current. The other devices may be distal devices adapted to communicate with the first communication device over a single phase through a modulated carrier signal at a communication frequency.

The common inductor node may be a common output to the first device. Each of the series parallel inductor-capacitor circuits may include a capacitor between each of the plurality of phases and a common capacitor node. The common capacitor node may be a common output to the first device.

The apparatus may further comprise a high pass filter in each of the plurality of receiver phases for attenuating the alternating electrical current from the plurality of receiver phases. The high pass filters may include an in-line capacitor between the parallel inductor-capacitor circuit and it's associated power line phase.

The plurality of phases may each include a signal transformer between the selective coupling circuit and it's associated power line phase. The transformers may have a one to one turns ratio.

Other aspects and features of the present invention will become apparent to those ordinarily skilled in the art upon review of the following description of specific embodiments of the invention in conjunction with the accompanying figures wherein similar characters of reference denote corresponding parts in each view.

DETAILED DESCRIPTION OF EMBODIMENTS OF THE INVENTION

Figure 3:
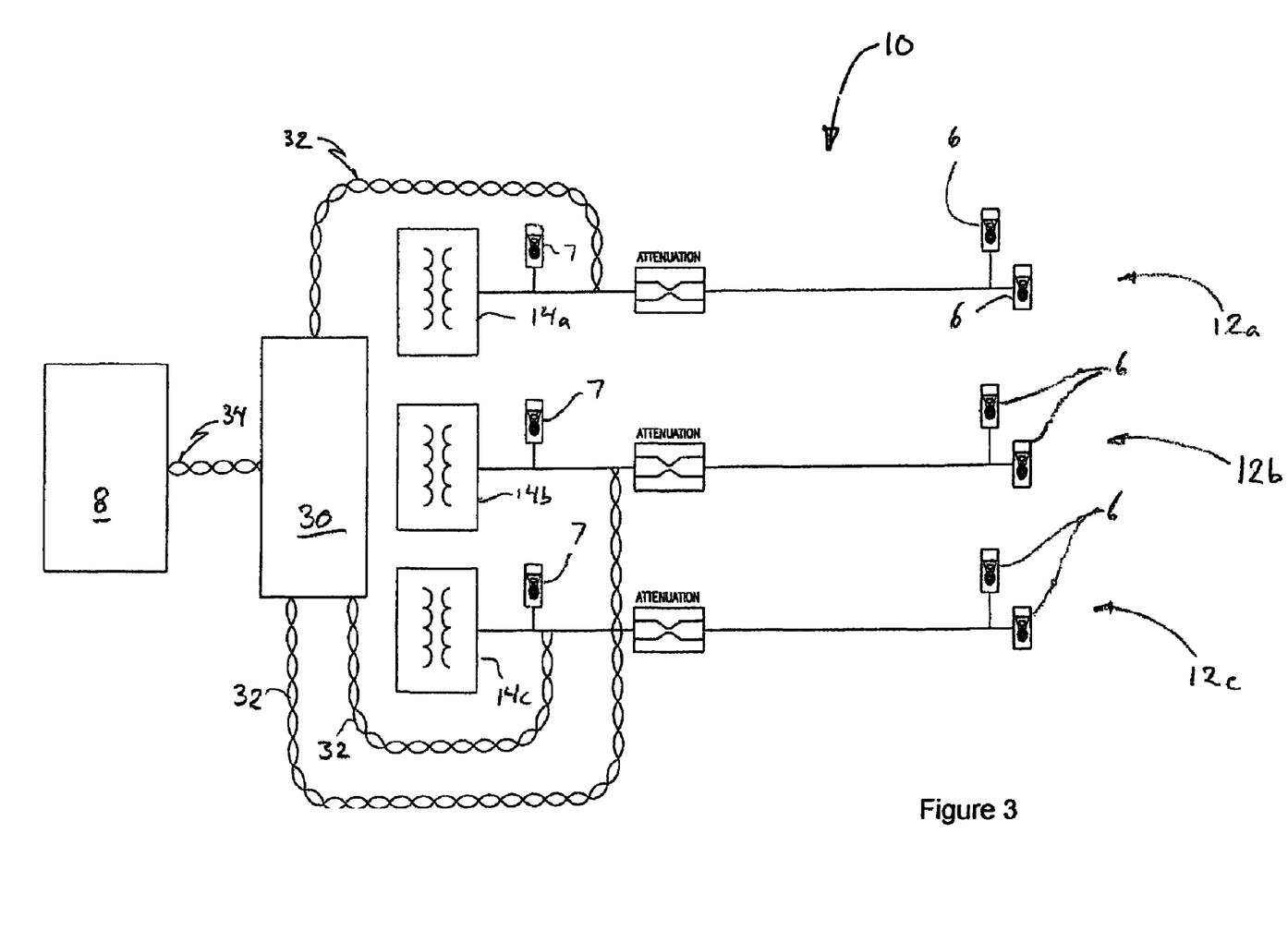
FIG. 3 is a block diagram of a system according to one embodiment of the present invention for communicating with a plurality of slaves on a plurality of phases of a power distribution system.

Referring to FIG. 3, a selective phase coupling apparatus according to a first embodiment of the invention is shown generally at 30 applied to a three phase power distribution system 10. The power distribution system includes first, second and third phases 12a, 12b, and 12c, respectively each having a corresponding transformer 14a, 14b and 14c, respectively. Although three transformers are illustrated in FIG. 3 it will be appreciated that the first, second and third transformers 14a, 14b and 14c and can be considered as separate transformers or as a single three phase transformer.

The power distribution system of FIG. 3 is similar to the prior art system of FIG. 1 but has the addition of a selective phase coupler 30 for attenuating noise between the phases. The selective phase coupler 30 is coupled to each of the power line phases 12a, 12b and 12c by connection wires 32 and to the central controller 8 by controller wires 34. The connection wires 32 and controller wires 34 may be any type of wiring as are known in the art. Repeaters 7 may also be included on each phase close to the connection wires 32. The repeaters 7 could be the same type of devices as the slaves 6 or they could be one of the slaves 6 or they could simply be a repeater or devices with reduced functionality to reduce their cost. The selective phase coupler 30 allows signals from the central controller 8 to be sent to slaves 6 on all phases.

The selective phase coupler 30 also allows the central controller 10 to receive signals from slaves 6 on all phases. The selective phase coupler 30 is adapted to attenuate signals between the phases so as to prevent noise from one phase from passing to and obscuring the signal on another phase. The selective phase coupler 30 will however permit the data signal to pass to the central controller 8 without permitting the data and the noise to pass between the phases. This means that data signal to the repeater 7 and slaves 6 on the first phase 12a will be less obscured than if the selective phase coupler 30 was not present. The central controller 8 can use this repeater 7 to communicate to the slaves 6 on the first phase 12a that would have been obscured by the noise of the second and third phases 12b and 12c if the selective phase coupler 30 had not been present. Although shown as a single central controller, it will be appreciated that a plurality or modular central controllers may also be employed.

Figure 4:
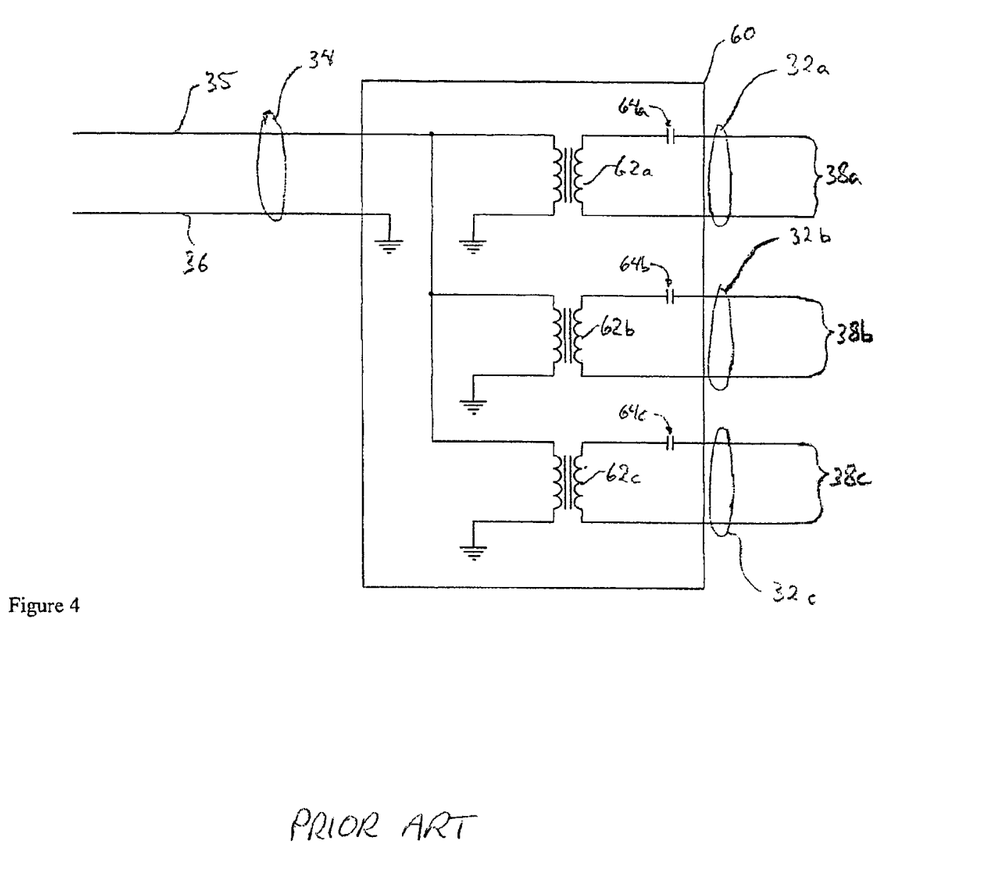
FIG. 4 is a schematic diagram of a prior art phase coupler having no isolation or attenuation between phases.

Turning now to FIG. 4 a phase coupler 60 that is not selective is illustrated. The central controller 8 transmits to and receives signals from the phase coupler 60 on the controller wires 34 which include a RX/TX wire 35 and a neutral or grounded wire 36. The non-selective phase coupler 60 is coupled to each of the power line phases 12a, 12b and 12c by connection wires 32a, 32b and 32c. In particular, the phase coupler 60 has first, second and third coupling phases 38a, 38b and 38c, respectively coupled to the corresponding first, second and third phases 12a, 12b and 12c of the power line. The non-selective phase coupler illustrated in FIG. 4 may include a transformer 62a, 62b and 62c and a capacitor 64a, 64b and 64c for each of the coupling phases 38a, 38b, and 38c. The capacitors 64a, 64b and 64c will act as a high pass filter for filtering out the alternating current electrical power signal while permitting a higher frequency modulated carrier signal carried on the power system to pass into the phase coupler 60. It will be appreciated both signal and noise will be summed at the RX/TX wire 35 for outputting to the central controller 8.

Figure 5:
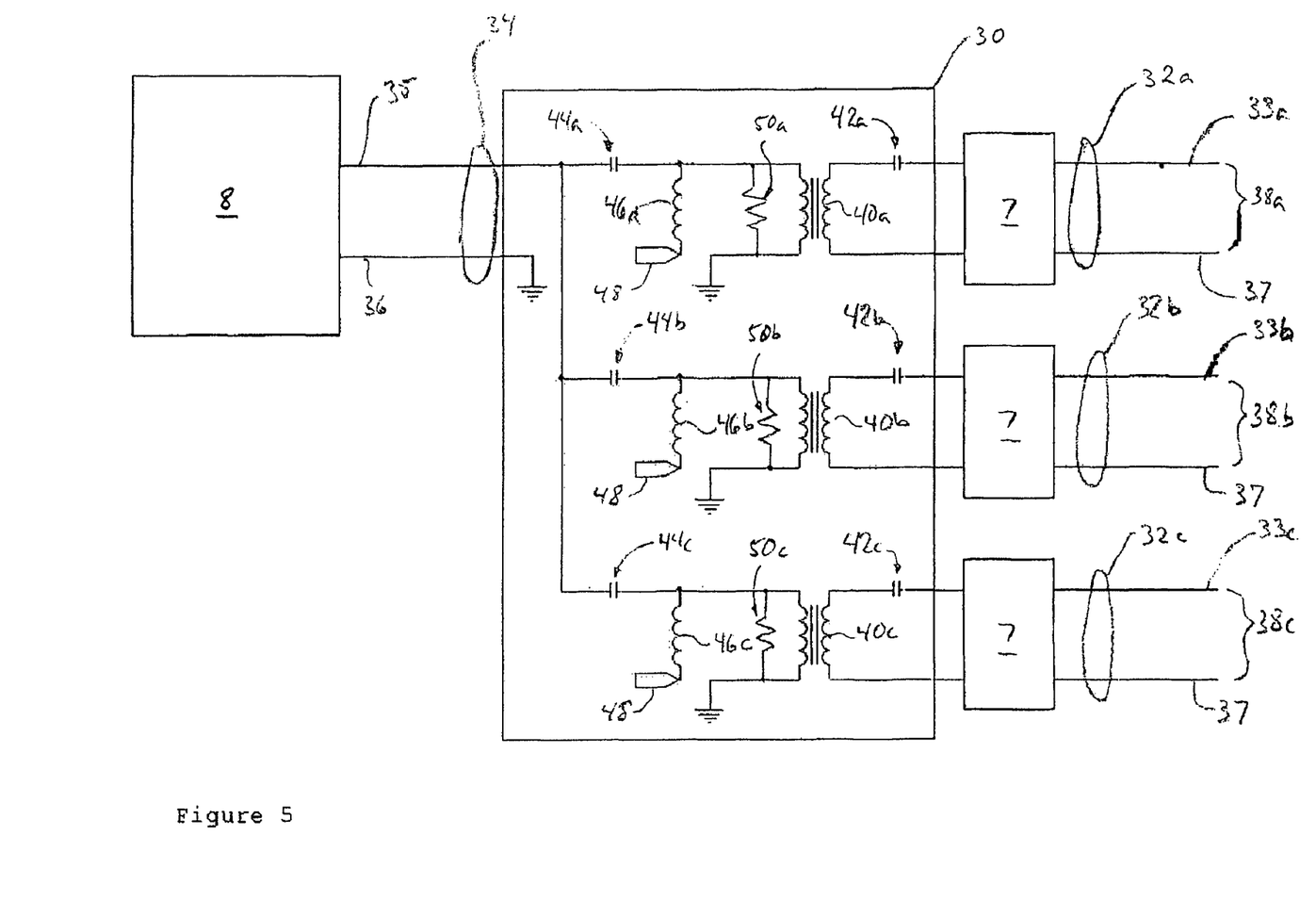
FIG. 5 is a schematic diagram of the phase coupler of FIG. 3 for coupling three phases.

FIG. 5 shows one embodiment of the selective phase coupler 30 of FIG. 3, that is according to a first embodiment of the present invention. The selective phase coupler 30 transmits to and receives signals from the central controller 8 on the RX/TX wire 35 and grounded wire 36. The selective phase coupler 30 also has first, second and third coupling phases 38a, 38b and 38c, respectively coupled to the corresponding first, second and third power line phases 12a, 12b and 12c similar to the prior art non-selective phase coupler 60. As illustrated, the first, second and third coupling phases 38a, 38b and 38c, each include a hot wire 33a, 33b and 33c and a neutral wire 37. It will be appreciated that the neutral wire 37 may be a common wire for all three phases or a separate wire for each phase.

The selective phase coupler 30 includes a includes a transformer 40a, 40b and 40c and a capacitor 42a, 42b and 42c for each of the coupling phases 38a, 38b, and 38c. Each of the coupling phases 38a, 38b, and 38c also includes an isolating inline capacitor 44a, 44b and 44c, respectively and a cross-phase inductor 46a, 46b and 46c to provide isolation between the phases. The cross-phase inductors 46a, 46b and 46c extend from each their respective phases to a common node 48. It will be appreciated, however that the capacitors 44a, 44b and 44c may extend to a common node for output to the central controller 8 while the inductors 46a, 46b, and 46c extend between the phases. The selective phase coupler may also include resistors 50a, 50b and 50c across the side of the transformers 40a, 40b and 40c associated with the central controller 8 to avoid having the impedance in that phase becoming unreasonably high. How the addition of capacitors and inductors provide isolation between the phases is better shown in FIG. 6 where only two phases are illustrated by way of example.

Figure 6:
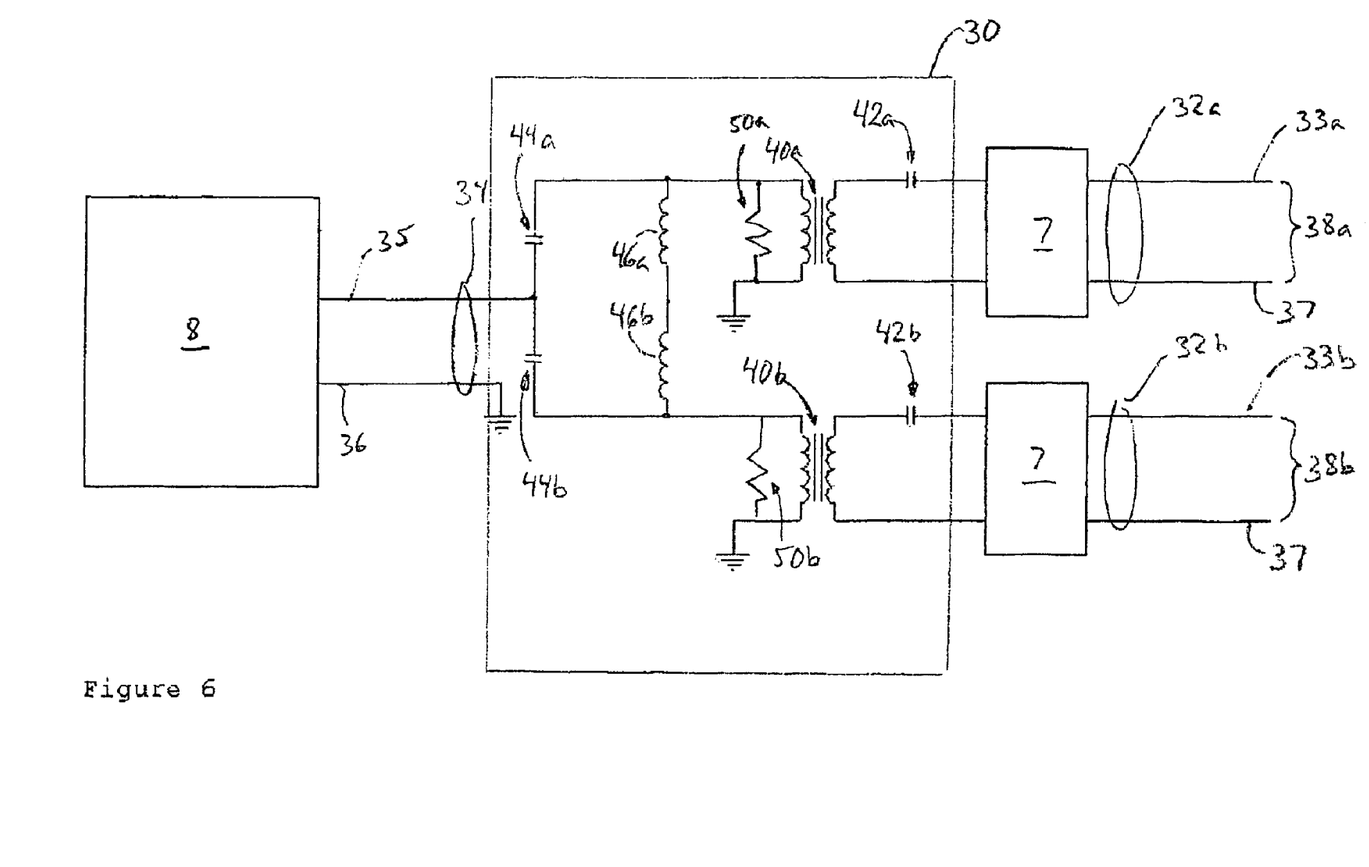
FIG. 6 is a schematic diagram of the phase coupler of FIG. 3 showing two coupled phases.

In FIG. 6, only two coupling phases 38a and 38b of the selective phase coupler 30 of FIG. 5 are illustrated for clarity. The central controller 8 can transmit to and receive from the repeater 7 on both the first phase 38a and second phase 38b through the inline capacitors 44a and 44b. Because the phases are already capacitor coupled at the output of transformers 40a and 40b this does not impede the outgoing or incoming signals greatly. Repeaters 7 such as discussed previously on power line phases 12a and 12b and on corresponding first and second coupling phases 38a and 38b can communicate to the central controller without significant additional attenuation. However, communications between phases is different. For noise from the first coupling phase 38a to pass to second coupling phase 38b it must pass through the in line capacitors 44a and 44b, and also through cross-phase inductors 46a and 46b. As can be seen the capacitors 44a and 44b are in series parallel with the inductors, 46a and 46b. It is well known that parallel capacitors and inductors form high impedance at resonance. Thus the capacitors and inductors combine to separate the first coupling phase 38a from the second coupling phase 38b for a desired communication band of frequencies. The capacitors and inductors may therefore be selected by well know methods to combine to make the resultant circuit resonant at the communications frequency or band of frequencies. For example, the capacitor and inductor could be selected using the equation one over the square root of LC equals two pi F, that is:

$$\frac{1}{\sqrt{LC}} = 2\pi F$$

Where:
L=the inductance of the inductor
C=the capacitance of the inductor
F=the resonant frequency Accordingly, by way of non-limiting example, if a resonant frequency of 100 kHz is sought, a 0.25 μF capacitor and a 10 μH inductor will be sufficient. The transmissions from the slaves communicating to controller 8 via the first power line phase 12a and first coupling phase 38a can now be received by the repeater 7 on the first coupling phase 38a and are not obscured by the noise on the second power line phase 12b or the second coupling phase 38b. The repeater 7 on the first coupling phase 38a can pass these transmissions to the central controller 8 because its signal is not attenuated. At the same time direct communication to and from the central controller 8 and slaves on all phases is essentially unimpeded. The present device will therefore allow central controllers to communicate to devices on various phases but does not add significant signal coupling between the phases.

While specific embodiments of the invention have been described and illustrated, such embodiments should be considered illustrative of the invention only and not as limiting the invention as construed in accordance with the accompanying claims. In particular, although the foregoing embodiments have illustrated a power system having three phases, it will be appreciated that the present invention will be useful in association with power systems having any other number of phases as well.

What is claimed is:

1. A method for communicating over an electrically conductive line having a plurality of power line phases between a first device having a single receiver and plurality of distal devices, the power line phases being adapted to deliver an alternating electrical current, each of the distal devices being adapted to communicate with the first device over a single phase through a modulated carrier signal at a single narrow communication frequency band which is not the frequency of the alternating electrical current, the method comprising the steps of:

attaching in electrical communication a unique coupling phase to a corresponding power line phase of said plurality of power line phases for receiving the single narrow communication frequency band having the modulated carrier signal from each of the plurality of power line phases, and out of the path of flow of the power line phase;

selectively coupling said plurality of phases to each other such that said single narrow communication frequency band is receivable on said unique coupling phase at the first device while minimizing signal coupling between said plurality of phases.

2. The method of claim 1 further comprising the step of attenuating said alternating electrical current from said plurality of coupling phases.

3. The method of claim 1 wherein said step of selectively coupling comprises providing a selectively attenuating circuit electrically connected between each of said plurality of phases wherein said selectively attenuating circuit is adapted to substantially block said frequency band from passing between any two of said plurality of phases.

4. The method of claim 3 wherein said selectively attenuating circuit is adapted to have a resonant frequency in the communication frequency band.

5. The method of claim 3 wherein said selectively attenuating circuit comprises a series parallel inductor-capacitor circuit between each of said plurality of phases.

6. An apparatus for communicating over an electrically conductive line having a plurality of power line phases between a first device having a single receiver and plurality of distal devices, the power line phases being adapted to deliver an alternating electrical current, each of the distal devices being adapted to communicate with the first device over a single phase through a modulated carrier signal at a single narrow communication frequency band which is not the frequency of the alternating electrical current, the apparatus comprising:

a unique coupling phase attachable in electrical communication to a corresponding power line phase of said plurality of power line phases for receiving the communication frequency band having the modulated carrier signal from said corresponding power line phase of said plurality of power line phases, and wherein said unique coupling phase when attached in electrical communication to said corresponding power line phase is out of a path of flow of said corresponding power line phase;

means for selectively coupling said plurality of phases to each other such that said single narrow communication frequency band is receivable on said unique coupling phase at the first device while minimizing signal coupling between said plurality of phases at said single narrow communication frequency band.

7. The apparatus of claim 6 wherein said unique coupling phase is a plurality of unique coupling phases, and wherein said means for selectively coupling is a selective coupling circuit, and wherein said means for communicating is a data signal interface.

8. The apparatus of claim 7 wherein said selective coupling circuit comprises a selectively attenuating circuit electrically connected between each of said plurality of phases wherein said selectively attenuating circuit is adapted to substantially block said frequency band from passing between any two of said plurality of phases.

9. The apparatus of claim 8 wherein said selectively attenuating circuit is adapted to have a resonant frequency in the communication frequency band.

10. The apparatus of claim 8 wherein said selectively attenuating circuit comprises a series parallel inductor-capacitor circuit between each of said plurality of phases.

11. The apparatus of claim 10 wherein said series parallel inductor-capacitor circuit includes an inductor between each of said plurality of phases and a common inductor node.

12. The apparatus of claim 11 wherein said common inductor node is a common output to the first device.

13. The apparatus of claim 10 wherein said series parallel inductor-capacitor circuit includes a capacitor between each of said plurality of phases and a common capacitor node.

14. The apparatus of claim 13 wherein said common capacitor node is a common output to the first device.

15. The apparatus of claim 7 further comprising a high pass filter in each of said plurality of coupling phases for attenuating said alternating electrical current from said plurality of coupling phases.

16. The apparatus of claim 15 wherein each said high pass filter includes an in-line capacitor between said parallel inductor-capacitor circuit and it's associated said power line phase.

17. The apparatus of claim 7 wherein each of said plurality of phases includes a signal transformer between said selective coupling circuit and it's associated said power line phase.

18. The apparatus of claim 17 wherein each of said transformers have a one-to-one turns ratio.

19. In a system where a plurality of remote devices communicate with a central controller on a corresponding plurality of phases using a single narrow communication frequency band which is not the frequency of an associated alternating electrical current, and where the summing together of noise on said plurality of phases will prevent a corresponding number of said plurality of remote devices on the corresponding different phases from communicating with the central controller due to unattenuated noise on a first phase interfering with an attenuated signal on a second phase, a method of selective phase coupling between said first and second phases comprising the steps of:

a) providing means for selectively inhibiting unattenuated in-band noise on said first phase from interfering with an attenuated signal on said second phase so as to minimize coupling between said first and second phases at said single narrow communication frequency band, b) allowing the central controller to communicate with the respective remote devices on said first and second phases, c) allowing the respective remote devices to communicate with the central controller on said first and second phases, d) selectively inhibiting unattenuated in-band noise on said first phase from interfering with an attenuated signal on said second phase whereby coupling is minimized between said first and second phases at said single narrow communication frequency band.

20. In a system where a plurality of remote devices communicate with a central controller on a corresponding plurality of phases using a single narrow communication frequency band which is not the frequency of an associate alternating electrical current, and where the summing together of noise on said plurality of phases will prevent a corresponding number of said plurality of remote devices on the corresponding different phases from communicating with the central controller due to unattenuated noise on a first phase interfering with an attenuated signal on a second phase, a selective phase coupler for coupling between said first and second phases comprising:

a) means for allowing the central controller to communicate with the respective remote devices on said first and second phases, b) means for allowing the respective remote devices to communicate with the central controller on said first and second phases, c) means cooperating between said first and second phases for selectively inhibiting unattenuated in-band noise on said first phase from interfering with an attenuated signal on said second phase whereby coupling is minimized between said first and second phases at said single narrow communication frequency band.

21. The method of claim 19 further comprising the step of attenuating said alternating electrical current from said plurality of coupling phases.

22. The method of claim 19 wherein said step of selectively inhibiting comprises providing a selectively attenuating circuit electrically connected between each of said plurality of phases wherein said selectively attenuating circuit is adapted to substantially block said frequency band from passing between any two of said plurality of phases.

23. The method of claim 22 wherein said selectively attenuating circuit is adapted to have a resonant frequency in the communication frequency band.

24. The method of claim 23 wherein said selectively attenuating circuit comprises a series parallel inductor-capacitor circuit between each of said plurality of phases.

25. The apparatus of claim 20 wherein said means for selectively inhibiting includes a selectively attenuating circuit electrically connected between each of said plurality of phases wherein said selectively attenuating circuit is adapted to substantially block said frequency band from passing between any two of said plurality of phases.

26. The apparatus of claim 25 wherein said selectively attenuating circuit is adapted to have a resonant frequency in the communication frequency band.

27. The apparatus of claim 25 wherein said selectively attenuating circuit comprises a series parallel inductor-capacitor circuit between each of said plurality of phases.

28. The apparatus of claim 27 wherein said series parallel inductor-capacitor circuit includes an inductor between each of said plurality of phases and a common inductor node.

29. The apparatus of claim 28 wherein said common inductor node is a common output to the first device.

30. The apparatus of claim 27 wherein said series parallel inductor-capacitor circuit includes a capacitor between each of said plurality of phases and a common capacitor node.

31. The apparatus of claim 30 wherein said common capacitor node is a common output to the first device.

* * * * *